UNITED STATES PATENT OFFICE.

WILLIAM W. WILDMAN AND JAMES CHRISTY, OF AKRON, OHIO.

PROCESS OF DESULFURIZING AND DEVULCANIZING RUBBER STOCK.

993,485.

Specification of Letters Patent.

Patented May 30, 1911.

No Drawing.

Application filed July 21, 1910. Serial No. 573,051.

*To all whom it may concern:*

Be it known that we, WILLIAM W. WILDMAN and JAMES CHRISTY, citizens of the United States, residing at Akron, in the county of Summit and State of Ohio, have invented certain new and useful Improvements in the Process of Desulfurizing and Devulcanizing Rubber Stock, of which the following is a specification.

Our invention relates to a new and useful process of restoring vulcanized rubber to a condition in which it can be reworked and used for the many purposes for which new rubber is used.

To this end the invention consists in reducing the rubber to suitably fine particles so as to permit the quick and complete action of chemicals thereon, and then employing the chemicals successively to effect the separation of the foreign substances from the rubber and to restore the same more or less nearly to its original state, or to what is known as new or crude rubber, and in certain other steps and operations in this connection as hereinafter fully described and particularly pointed out in the claims.

The first or primary step in desulfurizing and devulcanizing vulcanized rubber stock by our process consists in the reduction of the rubber to suitably fine particles which prepares it for the chemical and other treatments which follow, and this reduction is found to be best accomplished by cutting rather than grinding the stock as has heretofore been the practice. Usually we employ an especially designed machine for this purpose but the cutting may be accomplished in any other way, and the degree of fineness extends all the way from what might be considered comparatively coarse particles down to almost a rubber dust, the measure of reduction in any case depending largely upon the quality of the stock, the quantity of sulfur or other foreign matter therein and other conditions which an expert in the art will soon learn and which prepares the stock for the subsequent treatments. Now, having the stock reduced to a suitably fine state it is ready for the next step in the process which consists in boiling the stock in an acid solution. Any suitable means may be employed for this purpose but preferably this is done in an open tank adapted to bring the contents to a boiling state for a sufficient period and which is accompanied with agitation or stirring of the contents. As to this, let it be assumed that we have a batch of ground rubber weighing say approximately twenty-five hundred pounds. This is put into a tank with say forty-five to fifty hundred pounds of water and say one-thousand pounds of commercial hydrochloric acid, more or less, or in such quantity as to make a solution of approximately twenty per cent. actual acid strength, making a solution of six per cent. acid strength. Of course any equivalent acid or acid mixture may be used. A good construction of tank for this purpose has a sufficient number of lead pipes arranged within its bottom with steam connections to bring the solution to a boiling point within a reasonably short time. The boiling should continue say for a period of one hour or about that period, varying somewhat with the state of the rubber. Usually an hour is long enough, and while we do not pretend to define all the value or advantage of this treatment nor to say in what measure or way it enters into the devulcanizing processes, we do know that it has a positive and preparatory value at least and without which all the successive steps would be unavailing. Incidentally it may also be noted that by this treatment the rubber is converted into a spongy and expanded state to possibly three or four times its original bulk but without manifesting the adhesive tendency which it attains at a later period when perfect devulcanization has been accomplished. Obviously there has been a converting action at work through the acid or this material change in the character of the mass could not occur. Furthermore we have noted that all cellulose and other undesirable constituents, including all traces of fabric and the like are burned out if not actually destroyed and made soluble or so changed in character that they are removed in the treatment, or else have a lesser injurious influence on the finished product, and it liberates some of the sulfur and other inorganic elements or compounds, because we get sulfur fumes while the boiling occurs and the fillers also pass out with the acid solution and the subsequent washing or rinsing. After the said solution is drawn off the rubber remains in the tank and is as thoroughly washed as possible to remove the acid before proceeding to the next step in the treatment. After such washings the open tank is again filled with water as before and a quantity of sal-soda is added, say ninety to one hundred pounds or enough to make a solution about two per cent. soda strength. Steam is then again applied through the lead pipes as in the acid treatment and the contents are boiled and agitated together for a period of about an hour or until the soda has done its work. As to this we prefer not to be more specific than the proper understanding and successful practice of the invention by others may demand because it seems impossible to ascertain the exact action or final effect of the soda upon the mass, but this we can state positively that we have not found anything else equal to sal-soda in neutralizing the remaining traces of acid which did not come out with the fresh water washings or which so effectually enters into the rubber or combines therewith in this boiling operation to forward the result sought,—the devulcanization of the rubber. Sal-soda seems to have especial utility with the rubber at this time and in this treatment, and it leaves the rubber in such an advanced state of devulcanization that it already gives promise of its completion. Furthermore, and to possibly make still more clear why we use sal-soda it should not be forgotten that this treatment, like the acid treatment, is in an open vessel or tank, and as one of the signs or evidences of what is going on through the soda treatment we especially note the strong acid fumes that arise from the vessel and are dissipated in the open air. In fact one of the ways of telling when this boiling has been sufficient is when there are no longer any traces of acid arising from the tank.

Now, assuming that all traces of acid have thus been eliminated from the rubber stock and that the soda has advanced the devulcanizing process otherwise in greater or less measure, and the exact measure we do not attempt to estimate, the next and final step in chemical treatment consists in subjecting the rubber with its sal-soda solution to further boiling in a sealed metallic tank and to which solution a small percentage of an additional alkaline constituent has been added so as to intensify the soda action, and while this may simply mean adding more soda according to conditions found in the stock, say one-third to one-half more of soda in weight as compared with the original quantity used, we may instead add a less quantity of caustic soda. The only actual difference in these sodas as they work out in the process lies in the time they respectively take to do the work, and caustic soda will facilitate the ultimate result very materially over sal-soda under the same conditions otherwise. A three per cent. soda solution is found to be about right whichever soda is used. This boiling, in the closed tank, proceeds with a relatively low steam pressure, say from sixty-five to ninety-five pounds and which is equivalent to 310 to 335° F., and which can be obtained from any ordinary boiler or source of supply, and the boiling continues from three to five hours according to the condition of the rubber and, measurably, the strength of the alkaline solution. It should be noticed here as material to the invention that unless free acid be entirely removed in or by the original sal soda boiling treatment, it will inevitably be neutralized by the after treatment herein specified. Hence the primary soda treatment of the stock cannot be too strongly emphasized. It has also been noted that sulfur fumes often are quite pronounced at this time, which shows that the sulfur did not all go off with the acid solution and the subsequent fresh water washings. Devulcanization and desulfurization of the rubber results finally from these successive treatments, and after drawing off the soda solution the rubber is removed into one or more open tanks and flooded with clear fresh water through a series of successive washings to thoroughly eliminate all traces of soluble matter, if any remains. Then as a last operation the rubber is thoroughly pressed or squeezed to expel the moisture and then dried by any available means, such as a vacuum drier, a drier chamber or other devices, after which it is ready for use.

What we claim is:

1. The process of desulfurizing and devulcanizing rubber which consists, first, in boiling rubber stock in a finely divided state in an acid solution at atmospheric pressure until all fabric and other objectionable constituents are converted or destroyed as such, then washing the acid and other soluble substances out of the stock, and lastly, boiling the rubber in weak alkaline carbonate solution, in an open vessel and then in a closed vessel under pressure with an increased percentage of caustic alkali.

2. The process of devulcanizing rubber stock consisting in boiling the stock in an acid solution and then washing out the acid; then driving off or neutralizing any remaining acid in the stock by boiling the same in an open vessel in a solution containing a small per cent. of sal-soda, and after this boiling the stock three to five hours, more or less in a strong caustic soda solution in a 5 closed vessel with steam heat equal approximately to 310 to 335° F., and then washing and milling the rubber.

In testimony whereof we affix our signatures in the presence of two witnesses.

WILLIAM W. WILDMAN.
JAMES CHRISTY.

Witnesses:
  BERT EBERHARDT,
  W. H. SHAFFER.